(12) United States Patent
Rudick et al.

(10) Patent No.: US 6,422,025 B1
(45) Date of Patent: Jul. 23, 2002

(54) VIBRATIONALLY ISOLATED STIRLING COOLER REFRIGERATION SYSTEM

(75) Inventors: Arthur G. Rudick, Atlanta, GA (US); David M. Berchowitz; Dale E. Kiikka, both of Athens, OH (US)

(73) Assignee: The Coca-Cola Company, Atlanta, GA (US)

(*) Notice: Subject to any disclaimer, the term of this patent is extended or adjusted under 35 U.S.C. 154(b) by 0 days.

(21) Appl. No.: 09/817,354

(22) Filed: Mar. 21, 2001

(51) Int. Cl.[7] .............................. F25B 9/00; F25D 19/00
(52) U.S. Cl. ................................................ 62/6; 62/295
(58) Field of Search ........................................ 62/6, 295

(56) References Cited

U.S. PATENT DOCUMENTS

| | | | | |
|---|---|---|---|---|
| 1,475,234 A | * | 11/1923 | Lundgaard | 62/6 |
| 4,044,558 A | * | 8/1977 | Benson | 60/520 |
| 5,318,412 A | * | 6/1994 | Laskaris et al. | 417/417 |
| 5,642,622 A | * | 7/1997 | Berchowitz et al. | 62/6 |
| 5,642,624 A | * | 7/1997 | Gore | 62/51.1 |
| 5,655,376 A | * | 8/1997 | Price | 62/6 |
| 6,094,912 A | * | 8/2000 | Williford | 60/520 |
| H1866 H | * | 10/2000 | Wright | 62/6 |

* cited by examiner

*Primary Examiner*—William C. Doerrler
(74) *Attorney, Agent, or Firm*—Sutherland Asbill & Brennan LLP (57) ABSTRACT

A vibration isolation system for operating a Stirling cooler within an enclosure. The system may include a number of linkages for connecting the Stirling cooler to the enclosure. The system may further include a balance mass connected to the Stirling cooler by a balance mass spring. The balance mass also may be used to operate a pump based upon the vibrations produced by the Stirling cooler.

35 Claims, 3 Drawing Sheets

VIBRATIONALLY ISOLATED STIRLING COOLER REFRIGERATION SYSTEM

FIELD OF THE INVENTION

The present invention relates generally to refrigeration systems and more specifically relates to refrigeration systems with one or more Stirling coolers mounted therein so as to reduce internal vibrations.

BACKGROUND OF THE INVENTION

In the beverage industry and elsewhere, refrigeration systems are found in vending machines, glass door merchandisers ("GDM's"), and other types of dispensers and coolers. These systems generally have used a conventional vapor compression (Rankine cycle) refrigeration apparatus to chill beverages or other products therein. In the Rankine cycle apparatus, the refrigerant in the vapor phase is compressed in a compressor so as to cause an increase in temperature. The hot, high-pressure refrigerant is then circulated through a heat exchanger, called a condenser, where it is cooled by heat transfer to the surrounding environment. As a result, the refrigerant condenses from a gas back to a liquid. After leaving the condenser, the refrigerant passes through a throttling device where the pressure and the temperature of the refrigerant are reduced. The cold refrigerant leaves the throttling device and enters a second heat exchanger, called an evaporator, located in or near the refrigerated space. Heat transfer with the evaporator and the refrigerated space causes the refrigerant to evaporate or to change state from a saturated mixture of liquid and vapor into a superheated vapor. The vapor then leaves the evaporator and is drawn back into the compressor so as to repeat the cycle.

Although the Rankine cycle systems adequately chill the products therein and are in widespread use, there are several known disadvantages involved. First, the systems are generally large and heavy. Second, the systems may be noisy to operate. Third, the systems may have a significant power draw. Further, conventional Rankine systems generally use refrigerants for their working medium. These refrigerants are known to be harmful to the environment. The refrigerants may in some cases be noxious. The commonly used HFC refrigerant (134a) is generally assumed not to be noxious (though there have been claims to the contrary). It is known to be a powerful "greenhouse" gas to which there is no scientific doubt.

One alternative to the use of a Rankine cycle system is a Stirling cycle cooler. The Stirling cycle cooler is also a wellknown heat transfer mechanism. Briefly described, a Stirling cycle cooler compresses and expands a gas (typically helium) to produce cooling. This gas shuttles back and forth through a regenerator bed to develop much greater temperature differentials than may be produced through the normal Rankine compression and expansion process. Specifically, a Stirling cooler may use a displacer to force the gas back and forth through the regenerator bed and a piston to compress and expand the gas. The regenerator bed may be a porous element with significant thermal inertia. During operation, the regenerator bed develops a temperature gradient. One end of the device thus becomes hot and the other end becomes cold. See David Bergeron, Heat Pump Technology Recommendation for a Terrestrial Battery-Free Solar Refrigerator, September 1998. Patents relating to Stirling coolers include U.S. Pat. Nos. 5,678,409; 5,647,217; 5,638,684; 5,596,875 and 4,922,722, all incorporated herein by reference.

Stirling cooler units are desirable because they are nonpolluting, efficient, and have very few moving parts. The use of Stirling coolers units has been proposed for conventional refrigerators. See U.S. Pat. No. 5,438,848, incorporated herein by reference. The integration of a free-piston Stirling cooler into a conventional refrigerated cabinet, however, requires different manufacturing, installation, and operational techniques than those used for conventional compressor systems. See D. M. Berchowitz et al., Test Results for Stirling Cycle Cooler Domestic Refrigerators, Second International Conference. As a result, the use of the Stirling coolers in, for example, beverage vending machines, GDM's, and other types of dispensers, coolers, or refrigerators is not well known.

One difficulty in the use of a Stirling cooler is the constant vibration produced by the operation of the internal free piston. In order to avoid transmitting the vibrations to the products or to the other components of the refrigeration unit, it is desirable to isolate these vibrations from the refrigeration unit as a whole. If not isolated, such constant vibrations may cause an unwanted noise or even reduce the life of the refrigeration unit or the components therein.

A need exists therefore for adapting Stirling cooler technology to conventional beverage vending machines, GDM's, dispensers, and similar types of refrigeration units. Likewise, there is a need for isolating the Stirling coolers within these units so as to extend the life of the units and make the units more attractive to consumers.

SUMMARY OF THE INVENTION

The present invention thus provides a vibration isolation system for operating a Stirling cooler within an enclosure. The system may include a number of linkages for connecting the Stirling cooler to the enclosure. The system may further include a balance mass connected to the Stirling cooler by a balance mass spring.

Specific embodiments of the present invention include using the linkages to limit the movement of the Stirling cooler to a first dimension. The movement may be limited to about one or two degrees. The balance mass and the balance mass spring may be positioned adjacent to the Stirling cooler so as to vibrate in the first dimension. The Stirling cooler may vibrate with a given frequency while the balance mass spring may vibrate with substantially the same frequency out of phase by about 180 degrees. The balance mass and said balance mass spring are essentially resonant at the operating frequency of the Stirling cooler, usually about sixty (60) to about seventy-five (75) cycles per second.

The system also may include a frame to connect the Stirling cooler and the balance mass spring. Further, the system may include a first number of connectors attached to the enclosure and to the linkages and a second number of connectors attached to the Stirling cooler and to the linkages. The connectors may be pivot mounts.

The system further may include a guide attached to the enclosure. The guide may include a fixed retention device on a first end and a movable retention device on a second end. A carriage may be slidable along the guide. Pivot mounts may be attached to the carriage and the linkages and to the Stirling cooler and the linkages.

A further embodiment of the present invention may provide for a balance mass operated pump for use with a refrigeration system having a Stirling cooler. The pump may include a spring mounted in communication with the Stirling cooler and a balance mass attached to the spring for movement therewith. The balance mass may include a magnetic portion such that vibrations from the Stirling cooler are transmitted to the balance mass and the magnetic portion. The pump may further include a pump chamber positioned in communication with the magnetic portion of the balance mass. A magnetic piston may be positioned within the pump chamber such that the magnetic piston moves with the magnetic portion so as to provide a pumping action within the pump chamber.

The refrigeration system may further include an evaporator and a condenser connected by tubing such that the pump chamber is in fluid communication with the tubing. A frame may connect the Stirling cooler and the spring. The pump chamber may be mounted on the frame. The magnetic portion may include a tubular structure. The magnetic piston may include a hollow structure. The magnetic piston also may include a check valve positioned thereon.

The balance mass and the balance mass spring may be essentially resonant at about sixty (60) to about seventy-five (75) cycles per second. Specifically, the Stirling cooler may vibrate with a frequency and the balance mass spring may be resonant at a second frequency. The second frequency is chosen to reduce Stirling casing vibration to a minimum level.

A further embodiment of the present invention may provide for a vibration isolation system for mounting a Stirling cooler to a frame. The system may include a first number of mounts positioned on the frame, a second number of mounts positioned on the Stirling cooler, and a number of linkages. Each of the linkages may connect one of the first number of mounts and one of the second number of mounts.

The linkages may limit the movement of the Stirling cooler to a first dimension. The movement of the Stirling cooler may be limited to about one or two degrees in the first dimension. The system may include a guide rail attached to the frame. The guide rail may include a fixed retention device on a first end and a movable detention device on a second end. The first number of mounts may be attached to the carriage such that the carriage and the Stirling cooler can slide along the guide rail.

A further embodiment of the present invention provides for a refrigeration system powered by a Stirling cooler. The refrigeration system may include an outer frame. The outer frame may include a product area and a refrigeration deck area. A refrigeration deck may be positioned within the refrigeration deck area. The refrigeration deck may include a first section and a second section. An insulated plate may separate the first section and the second section. The Stirling cooler may be hung within the first section by a number of linkages so as to reduce the amount or the extent of the vibrations transmitted by the Stirling cooler to the insulated plate.

The first section may include a condenser positioned therein. The condenser may be in communication with the Stirling cooler. The second section may include an evaporator positioned therein. The evaporator may be in communication with the condenser via a number of lengths of tubing. The second section may include an air movement device positioned therein to circulate air through the refrigeration deck area and the product area. The system further may include a balance mass operated pump positioned in communication with the tubing so as to pump fluid from the condenser to the evaporator. The balance mass operated pump may be positioned in communication with the Stirling cooler so as to absorb the vibrations produced therefrom.

Other objects, features, and advantages of the present invention will become apparent upon review of the following specification when taken in conjunction with the drawings in the appended claims.

DETAILED DESCRIPTION OF THE INVENTION

Figure 1:
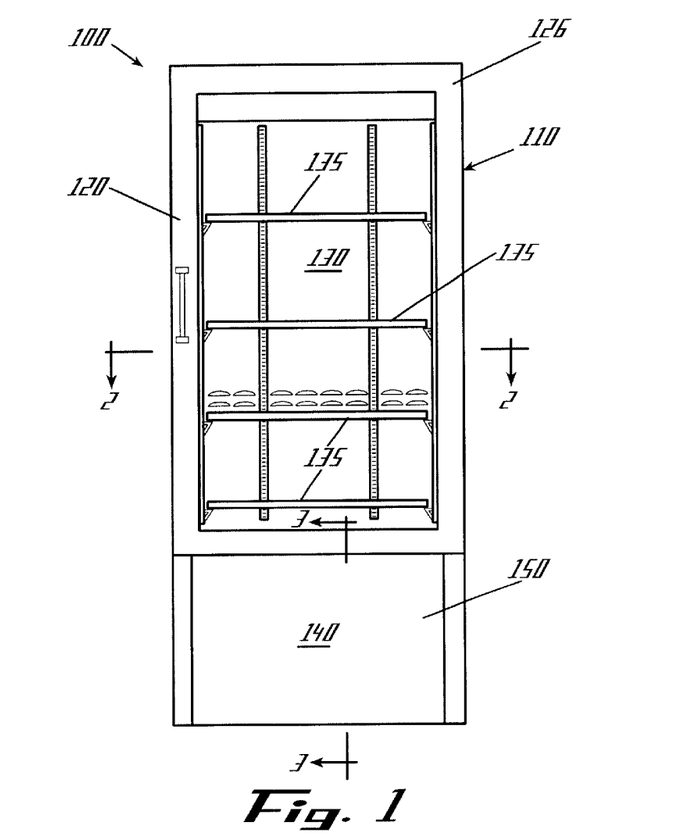
FIG. 1 is a plan view of a glass door merchandiser.
Figure 2:
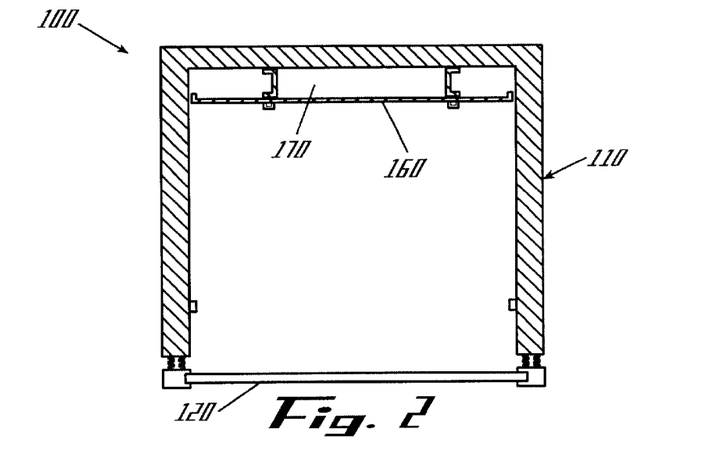
FIG. 2 is top cross-sectional view of the glass door merchandiser taken along line 2—2 of FIG. 1.
Figure 3:
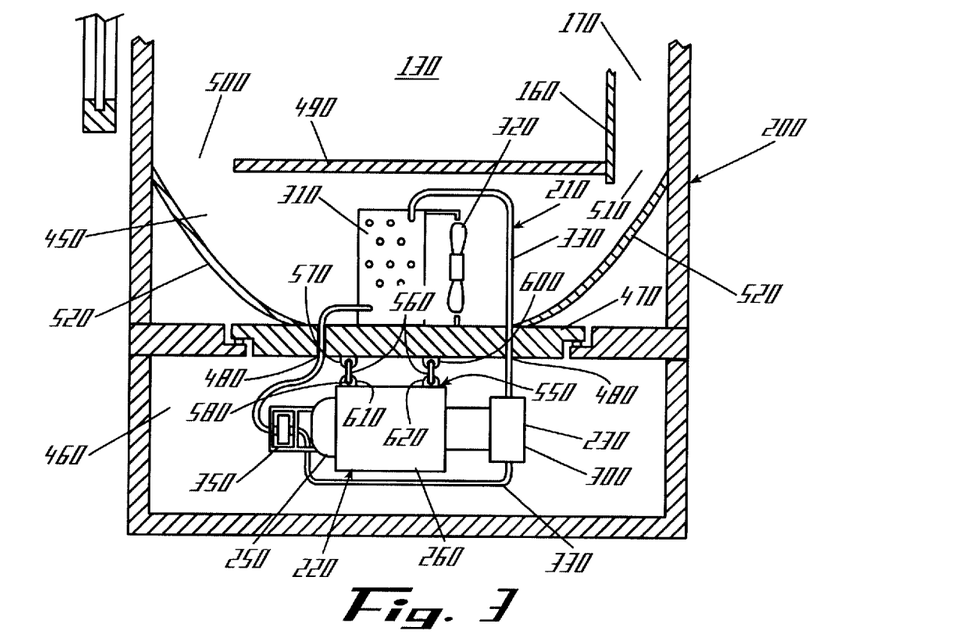
FIG. 3 is a side cross-sectional view of the refrigeration deck of the glass door merchandiser showing the vibration isolation system and the balance mass operated pump, taken along line 3—3 of FIG. 1.

Referring now to the drawings, in which like numerals indicate like elements throughout the several views, FIGS. 1–3 show a glass door merchandiser 100 ("GDM 100") for use with the present invention. The GDM 100 may be largely of conventional design. For example, the GDM 100 may be made the BeverageAir Company of Spartanburg, S.C. and sold under various designations and configurations. Although the use of the GDM 100 is described herein, it is understood that the invention described herein also is applicable to vending machines, beverage dispensers, refrigerators, or any type of refrigerated space or enclosure.

Generally described, the GDM 100 may include an outer insulated frame 110 with an outer door 120. The insulated frame 110 may be made out of or insulated with foamed polyurethane, vacuum-insulated panels, or similar types of materials or methods. The door 120 may generally include a transparent panel 125 surrounded by a door frame 126. The GDM 100 also generally includes a refrigerated area 130 with a number of internal shelves 135 positioned therein for storing and offering for sale or use a number of refrigerated products. Any configuration or size of the frame 110, the door 120, the refrigerated area 130, and the shelves 135 may be used with the GDM 100 as described herein.

The GDM 100 also may include a refrigeration deck area 140 for the location of a refrigeration deck with the refrigeration components as described in more detail below. The refrigeration deck area 140 may be at the top or the bottom of the insulated frame 110. Access to the refrigeration deck area 140 may be provided through the refrigerated area 130 or through an access area 150 positioned anywhere along the insulated frame 110.

The GDM 100 also may have a false back 160 spaced apart from one wall of the frame 110. The false back 160 may create an air passageway 170 that leads from the refrigeration deck area 140 along the length of the frame 110 so as to distribute refrigerated air. The false back 160 may have a number of louvers 180 or other type of openings therein so as to circulate the refrigerated air into the refrigerated area 130.

Although the present invention has been described in terms of the refrigeration deck area 140 and the false back 160, it is important to note that the GDM 100 may accommodate any configuration of refrigeration components or air circulation systems. The design and organization of the GDM 100 as described herein should not limit the scope or adaptability of the components as described in detail below. Specifically, any type or configuration of the GDM 100 or other structure may be used herein.

FIG. 3 shows a refrigeration deck 200. The refrigeration deck 200 includes the refrigeration components 210 therein. Generally described, the refrigeration components 210 may include one or more Stirling coolers 220. As is well known, a Stirling cooler 220 may include a cold end 230 and a hot end 240. The Stirling cooler 220 may be driven by a free piston (not shown) positioned within a casing 250. An outer tube 260 may surround the casing 250. A radially-finned heat exchanger 270 may be located between the hot end 240 and the outer tube 260. A fan 280 or any other type of air movement device also may be positioned within or adjacent to the outer tube 260. The fan 280 may draw air through the heat exchanger 270 so as to remove waste heat from the hot end 240 of the Stirling cooler 220. By way of example, the Global Cooling Company of Athens, Ohio may manufacture a Stirling cooler 220 suitable for use with the present invention. Any conventional type of Stirling cooler 220, however, may be used herein. Further, any number of Stirling coolers 220 may be used herein.

The refrigeration components 210 also may include a conventional condenser 300 attached to the cold end 230 of the Stirling cooler 220. The condenser 300 may be a block or a tube-type condenser or any other conventional form. The condenser 300 may be made out of aluminum or other materials with good heat conducting characteristics. The block condenser 300 may be positioned directly on the cold end 230 of the Stirling cooler 220. Alternatively, the tube condenser 300 may be wrapped around the cold end 230. Any conventional type of heat exchanger may be used.

The refrigeration components 210 also may include an evaporator 310. The evaporator 310 may be a conventional fin and tube-type evaporator. The evaporator 310 may be made out of aluminum, steel, or similar types of materials. Alternatively, any conventional type of heat exchanger also may be used.

Positioned adjacent to the evaporator 310 may be a fan 320. Although the term "fan" 320 is used herein, the fan may be any type of air movement device, such as a pump, a bellows, a screw, and the like known to those skilled in the art. The fan 320 directs a flow of air through the evaporator 310 and into the refrigerated space 130. The condenser 300 and the evaporator 310 may be connected by a series of tubing 330. The tubing 330 may be made out of copper, aluminum, steel, or similar types of materials.

Figure 4:
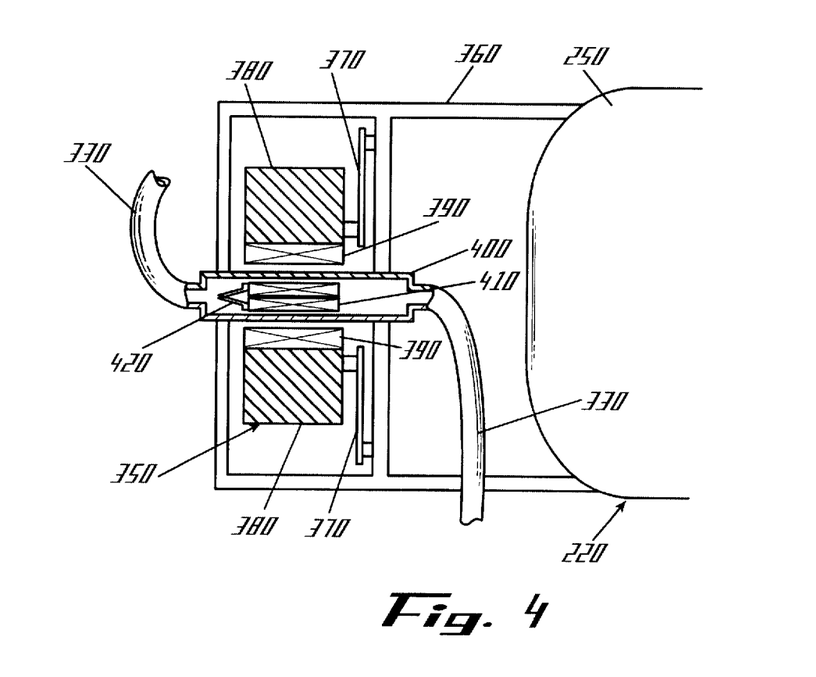
FIG. 4 is a side cross-sectional view of the vibration isolation system of FIG. 3.

The condenser 300 and the evaporator 310 may be connected on the fluid side with a balance mass operated pump 350. As is shown in FIG. 4, the balance mass operated pump 350 may include a rigid frame 360 that may be attached to the casing 250 or the outer tube 260 of the Stirling cooler 220. The frame 360 may be made out of a substantially rigid material such as steel, aluminum, or similar types of materials. Attached to the frame 360 may be a balance mass spring 370. The balance mass spring 370 may be pre-calibrated so as to provide a resonance to the balance mass system at a specific frequency or to respond to motion with a vibration at a given phase. Attached to the balance mass spring 370 may be the balance mass 380 itself As is well known, the balance mass 380 may be a substantially tubular structure that is mounted on the balance mass spring 370 for vibration therewith.

The mass of the balance mass 380 and the calibration of the balance mass spring 370 may be pre-determined so as to counteract or reduce the vibrations produced by the Stirling cooler 220. In other words, the balance mass 380 and the balance mass spring 370 may be tuned so that their resonance frequency equals the operating frequency of the Stirling cooler 220. For example, if the Stirling cooler 220 vibrates at about sixty (60) to about seventy-five (75) cycles per second, then the balance mass 380 and the balance mass spring 370 will also vibrate at about sixty (60) to about seventy-five (75) cycles per second. The balance mass 380 and the balance mass spring 370, however, are out of phase with the body of the Stirling cooler 220 by about one hundred eighty (180) degrees. This phase change will essentially cause the opposing vibrations to cancel each other out.

The calibration of the balance mass 380 and the balance mass spring 370 is well known to those skilled in the art. Specifically, the spring 370 may be chosen so that its spring rate (force per unit deflection) is such that when attached to a particular mass it forms a spring-mass system resonant at a particular frequency. The resonant frequency (in radians per second) generally equals the square root of the spring rate (in Newtons per meter) divided by the mass (in Kilograms). The resonant frequency may or may not be set at the operating frequency depending on the desired system response. In this case, the balance mass 380 and the spring 370 (i.e., the spring rate) have a resonance chosen to be at the operating frequency of the Stirling cooler 220. By so doing the balance mass 380 will balance the casing motions (in the ideal case) of the Stirling cooler 220. (In practice there will be some residual vibration.)

During operation, the Stirling cooler 220 vibrates with its driven frequency. The balance mass 380 and spring 370 are selected such that they form a resonance at the driven frequency of the Stirling cooler 220. By so doing, the residual vibration of the Stirling cooler 220 is essentially reduced to the minimum possible level.

Attached to the balance mass 380 may be a balance mass magnet 390. The balance mass magnet 390 may be a section of the balance mass 380 or the balance mass magnet 390 and the balance mass 380 may be one and the same. The balance mass magnet 390 may be made out of any magnetizable material. The balance mass magnet 390 may encircle a pump chamber 400. The pump chamber 400 may be largely hollow and may be fixedly attached to the frame 360. The pump chamber 400 may be made out of any substantially rigid material such as brass, aluminum, steel, plastic, or similar types of materials. The pump chamber 400 is in fluid communication with the tubing 330.

Positioned within the pump chamber 400 may be a magnetic piston 410. The magnetic piston 410 may be made out of any magnetizable material such as any ferrous metal or similar types of materials. The magnetic piston 410 may be a substantially hollow structure. The magnetic piston 410 may provide reciprocating motion within the pump chamber 400. The magnetic piston 410 may have a reed check valve 420 or a similar type of one-way valve positioned on one end.

As the balance mass magnet 390 vibrates with the balance mass 380 due to the vibrations produced by the Stirling cooler 220, the magnetic piston 410 is pulled back and forth by magnetic attraction. This back and forth motion creates a pumping action so as to provide a flow of fluid from the condenser 300 to the evaporator 310. The reed check valve 420 largely prevents the back flow of fluid as the piston 410 moves to the left. The inertia of the fluid itself drives the fluid through the check valve 420 when the piston 410 moves to the right.

The refrigeration components 210 may be positioned within the refrigeration deck 200 in an evaporator section 450 and a condenser section 460. An insulated plate 470 may divide the evaporator section 450 and the condenser section 460. The insulated plate 470 may be insulated with foamed polyurethane, vacuum insulated panels, or by similar types of insulating methods and/or materials. The insulated plate 470 may be removable to provide access to the components within the condenser section 460. The insulated plate 470 may have a number of apertures 480 therein. The apertures 480 may be sized to accommodate the tubing 330 or other structures.

A top insulated wall 490 also may define the evaporator section 450. The top insulated wall 490 may separate the refrigeration deck area 140 from the refrigerated area 130 and the false back 160. The top insulated wall 490 may include an intake aperture 500 and out-take aperture 510. The in-take aperture 500 permits return air from the refrigerated area 130 to enter into the refrigeration deck area 140. Likewise, the out-take aperture 510 connects the refrigeration deck area 140 to the false back 160. The top insulated wall 490 may be omitted if desired. Alternatively, the top insulated wall 490 may be removable to allow easy removal of the refrigeration deck 200.

Positioned within the evaporator section 450 may be the evaporator 310 and the fan 320. The evaporator section 450 also may include one or more deflection plates 520. The deflection plates 520 may direct the flow of air through the evaporator 310 and the fan 320. The evaporator 310 may be fixedly attached to the insulated plate 470. Likewise, the fan 320 may be fixedly attached to the insulated plate 470 via a frame member 475 or by a similar type of structure.

In the condenser section 460, the Stirling cooler 220 may be mounted by a vibration isolation system 550. The vibration isolation system 550 may include a number of linkages 560 and a number of pivot mounts 570. The pivot mounts 570 may each include an aperture 580 therein so as to accommodate the linkages 560. The linkages 560 may be in the form of a substantially continuous metal wire. The linkages 560 may be made out of steel, aluminum, or similar types of materials. In this embodiment, a first pivot mount 590 and a second pivot mount 600 may be fixedly attached to the insulated plate 470. Likewise, a third pivot mount 610 and a fourth pivot mount 620 are fixedly attached to the casing 250 or the outer tube 260 of the Stirling cooler 220. The vibration isolation system 550 allows the Stirling cooler 220 to swing or pivot by one or two degrees in a largely horizontal direction. This motion may dissipate the vibrations transmitted by the Stirling cooler 220 to the insulated plate 470 and the GDM 100 as a whole.

In addition to the linkages 560, any type of hanging mechanism may be used. For example, the Stirling cooler 220 may be attached to the insulated plate 470 by chains, cables, or similar mechanisms so as to limit the motion of the Stirling cooler 220 largely to the horizontal direction. Further, the Stirling cooler 220 may be hung from the insulated plate 470 by wires, springs, or similar structures if movement outside of the horizontal direction can be limited. For example, the wires may be positioned within a guide so as to limit movement of the Stirling cooler 220 to essentially one plane.

Figure 5:
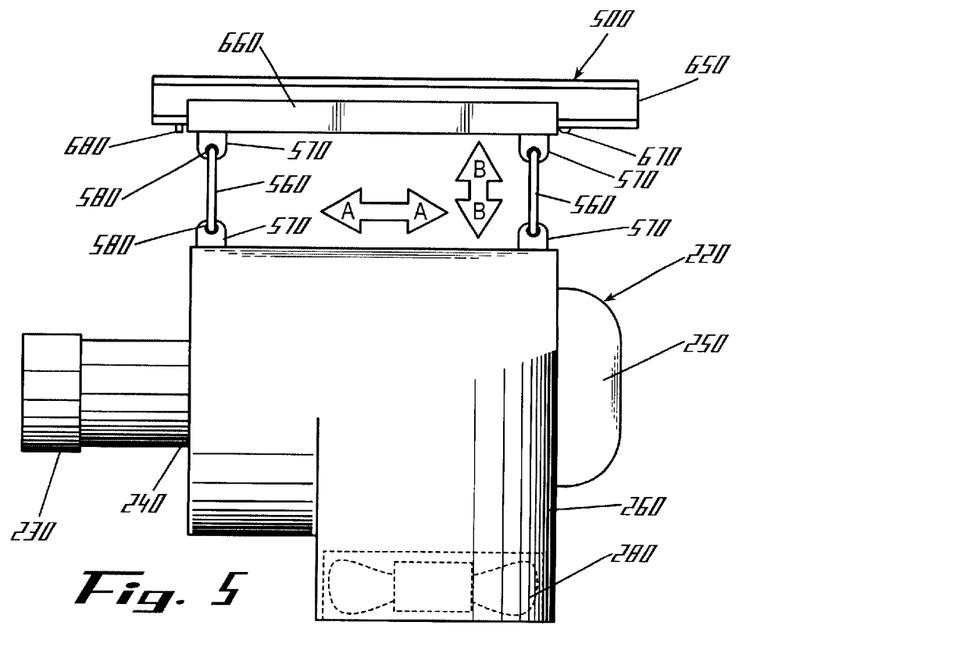
FIG. 5 is a side plan view taken of an alternative vibration isolation system.
Figure 6:
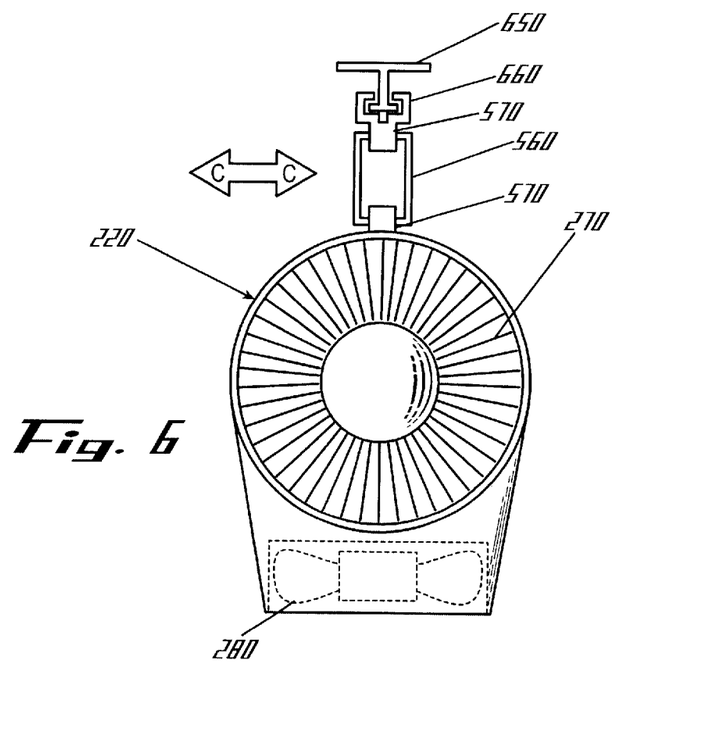
FIG. 6 is a front plan view of the alternative vibration isolation system of FIG. 5.

An alternative embodiment is shown in FIGS. 5 and 6. In this embodiment, the vibration isolation system 550 is used with a guide rail 650 that may be directly connected to the frame 110 of the GDM 100, the insulated plate 470, or otherwise attached within the refrigeration deck area 140. A sliding carriage 660 may be positioned on the guide rail 650. The carriage 660 may maneuver in the A—A direction along the guide rail 650. The movement of the carriage 660 may be limited by a detent pin 670 located on one end of the guide rail 650 and a locating pin 680 located on another end of the guide rail 650. The detent pin 670 may be stationary. The detent pin 670 may be spring-loaded. By pushing the detent pin 670 in, the carriage 660 may slide off or on the guide rail 650 as desired.

The pivot mounts 570 may be attached to the carriage 660 and the Stirling cooler 220 as described in the embodiment above. As above, the vibration isolation system 550 allows the Stirling cooler 220 to pivot in the A—A direction while largely preventing moment in the B—B direction or the C—C direction. Pivoting in the A—A direction may be limited to one (1) or two (2) degrees. The use of the guide rail 650 allows for the easy installment and replacement of the Stirling cooler 220 while also providing vibration isolation.

In use, the Stirling cooler 220 is mounted within the condenser section 460 via the vibration isolation system 550. The condenser 300 is attached to the cold end 230 of the Stirling cooler 220. The evaporator 310 is positioned within the evaporator section 450 with the fan 320 positioned adjacent thereto. The balance mass operated pump 350 is mounted onto the casing 250 or the outer tube 260 of the Stirling cooler 220. The condenser 300 and the evaporator 310 are connected via the tubing 330 and the balance mass operated pump 350.

If a phase change fluid is used within the refrigeration components 210, the fluid may be carbon dioxide, acetone, ethylene, isobutene, or similar types of fluids. Heat may be removed from the fluid at the condenser 300 so as to change the fluid from a gas to a liquid. The liquid then passes through the tubing 330 to the balance mass operated pump 350. Vibrations from the Stirling cooler 220 cause the balance mass 380 and the balance mass magnetic 390 to vibrate at a given frequency. This vibration causes the magnetic piston 410 to move back and forth within the pump chamber 400. This back and forth movement causes a pumping action that forces the fluid from the condenser 300 to the evaporator 310. A backward flow of the fluid is prevented by the reed check valve 420 and also by fluid inertia. The fluid thus continues to the evaporator 310 where heat is transferred from the passing airflow to the fluid. The fluid thus changes phase again from a liquid to a gas and returns to the condenser 300.

Alternatively, a non-phase change fluid also may be used. For example, propylene glycol solution, ethylene glycol solution, or similar fluids may be used. Although such a fluid does not change phase, the fluid does transfer heat in an effective manner. With the use of such a fluid, conventional heat exchangers could be used in place of the condenser 300 and the evaporator 310.

The fan 320 draws air into the evaporator section 450 via the in-take aperture 500. The in-take air is drawn through the evaporator 310 and is chilled therein as described above. The fan 320 then forces the chilled air through the out-take aperture 510 and into the false back 160. The air is directed through the louvers 180 into the refrigerated area 130 of the GDM 100. The refrigerated air thus chills and keeps chilled the products positioned within the GDM 100.

The vibrations produced by the Stirling cooler 220 are largely isolated through the combined use of the vibration isolation system 550 and the balance mass operated pump 350. By suspending the Stirling cooler 220 via the linkages 560, the Stirling cooler 220 is allowed to swing or pivot in the A—A direction. The one or two degree pivoting range thus accommodates vibration with a relatively small amplitude.

Likewise, the balance mass operated pump 350 includes a balance mass spring 370 that is tuned to counteract the vibrations produced by the Stirling cooler 220. The balance mass spring 370 may counteract larger amplitude vibrations. The balance mass operated pump 350 likewise uses these vibrations to operate the magnetic piston 410 so as to pump the refrigeration fluid from the condenser 300 to the evaporator 310.

The use of the vibration isolation system 550 itself may reduce the amount of vibration transmitted from the Stirling cooler 220 to the frame 110 of the GDM 100 by about ninety (95) to ninety-five (95) percent. The combined use of the vibration isolation system 550 and the balance mass operated pump 350 may reduce vibrations by up to ninety-nine (99) percent. The Stirling cooler 220 is thus substantially vibrationally isolated.

It should be apparent that the foregoing relates only to the preferred embodiments of the present invention and that numerous changes and modifications may be made herein without departing from the spirit and scope of the invention as defined by the following claims.

We claim:

1. A vibration isolation system for operating a Stirling cooler within an enclosure, comprising:
   a plurality of linkages for connecting said Stirling cooler to said enclosure;
   a balance mass; and
   a balance mass spring connecting said balance mass to said Stirling cooler.

2. The vibration isolation system of claim 1, wherein said plurality of linkages limits the movement of said Stirling cooler to a first dimension.

3. The vibration isolation system of claim 2, wherein said plurality of linkages limits the movement of said Stirling cooler to about one or two degrees in said first dimension.

4. The vibration isolation system of claim 2, wherein said balance mass and said balance mass spring are positioned adjacent to said Stirling cooler so as to vibrate in said first dimension.

5. The vibration isolation system of claim 1, wherein said Stirling cooler vibrates with a given frequency and wherein said balance mass spring vibrates at about said given frequency about one hundred eighty (180) degrees out of phase.

6. The vibration isolation system of claim 1, further comprising a frame, said frame connecting said Stirling cooler and said balance mass spring.

7. The vibration isolation system of claim 1, wherein said balance mass and said balance mass spring are essentially resonant at about sixty (60) to about seventy-five (75) cycles per second.

8. The vibration isolation system of claim 1, further comprising a first plurality of connectors attached to said enclosure and to said plurality of linkages and a second plurality of connectors attached to said Stirling cooler and to said plurality of linkages.

9. The vibration isolation system of claim 8, wherein said first and second plurality of connectors comprise pivot mounts.

10. The vibration isolation system of claim 1, further comprising a guide attached to said enclosure.

11. The vibration isolation system of claim 10, wherein said guide comprises a fixed retention device on a first end and a movable retention device on a second end.

12. The vibration isolation system of claim 11, further comprising a carriage, said carriage movable along said guide.

13. The vibration isolation system of claim 12, further comprising a first plurality of pivot mounts attached to said carriage and to said plurality of linkages and a second plurality of pivot mounts attached to said Stirling cooler and to said plurality of linkages.

14. A balance mass operated pump for use with a refrigeration system having a Stirling cooler, comprising:
   a spring mounted in communication with said Stirling cooler;
   a balance mass attached to said spring for movement therewith;
   said balance mass comprising a magnetic portion such that vibrations from said Stirling cooler are transmitted to said balance mass and said magnetic portion;
   a pump chamber positioned in communication with said magnetic portion of said balance mass; and
   a magnetic piston positioned within said pump chamber such that said magnetic piston moves with said magnetic portion so at to provide a pumping action within said pump chamber.

15. The balance mass operated pump of claim 14, wherein said refrigeration system further includes an evaporator and a condenser connected by tubing, and wherein said pump chamber is in fluid communication with said tubing.

16. The balance mass operated pump of claim 14, further comprising a frame, said frame connecting said Stirling cooler and said spring.

17. The balance mass operated pump of claim 16, wherein said pump chamber is mounted on said frame.

18. The balance mass operated pump of claim 14, wherein said Stirling cooler vibrates with a frequency and wherein said balance mass spring is resonant at a second frequency and wherein said second frequency is chosen to reduce Stirling casing vibration to a minimum level.

19. The balance mass operated pump of claim 14, wherein said balance mass spring is resonant at a predetermined frequency.

20. The balance mass operated pump of claim 14, wherein said balance mass spring vibrates about one hundred eighty (180) degrees out of phase with said Stirling cooler.

21. The balance mass operated pump of claim 14, wherein said magnetic portion comprises a tubular structure.

22. The balance mass operated pump of claim 14, wherein said magnetic piston comprises a hollow structure.

23. The balance mass operated pump of claim 14, wherein said magnetic piston comprises a check valve positioned thereon.

24. A vibration isolation system for mounting a Stirling cooler to a support element, comprising:
   a first plurality of mounts positioned on said support element;
   a second plurality of mounts positioned on said Stirling cooler; and
   a plurality of linkages, each of said plurality of linkages connecting one of said first plurality of mounts and one of said second plurality of mounts.

25. The vibration isolation system of claim 24, wherein said plurality of linkages limits the movement of said Stirling cooler to a first dimension.

26. The vibration isolation system of claim 24, wherein said plurality of linkages limits the movement of said Stirling cooler to about one or two degrees in said first dimension.

27. The vibration isolation system of claim 24, further comprising a guide attached to said frame.

28. The vibration isolation system of claim 27, wherein said guide comprises a fixed retention device on a first end and a movable retention device on a second end.

29. The vibration isolation system of claim 28, further comprising a carriage and wherein said first plurality of mounts are attached to said carriage such that said carriage and said Stirling cooler can slide along said guide.

30. A refrigeration system powered by a Stirling cooler, said refrigeration system comprising:
- an outer frame;
- said outer frame comprising a product area and a refrigeration deck area; and
- a refrigeration deck positioned within said refrigeration deck area;
- said refrigeration deck comprising a first section and a second section;
- said first section and said second section separated by an insulated plate; and
- said Stirling cooler hung within said first section by a plurality of linkages so as to reduce the amount of vibration transmitted by said Stirling cooler to said insulated plate.

31. The refrigeration system of claim 30, wherein said first section comprises a condenser positioned therein, said condenser positioned in communication with said Stirling cooler.

32. The refrigeration system of claim 31, wherein said second section comprises an evaporator positioned therein, said evaporator in communication with said condenser via a plurality of tubing.

33. The refrigeration system of claim 32, wherein said second section comprises an air movement device positioned therein to circulate air through said refrigeration deck area and said product area.

34. The refrigeration system of claim 32, further comprising a balance mass operated pump positioned in communication with said tubing so as to pump fluid from said condenser to said evaporator.

35. The refrigeration system of claim 34, wherein said balance mass operated pump is positioned in communication with said Stirling cooler so as to absorb vibrations produced therefrom.

* * * * *

UNITED STATES PATENT AND TRADEMARK OFFICE
CERTIFICATE OF CORRECTION

PATENT NO. : 6,422,025 B1
DATED : July 23, 2002
INVENTOR(S) : Rudick et al.

It is certified that error appears in the above-identified patent and that said Letters Patent is hereby corrected as shown below:

<u>Title page,</u>

Item [56], insert: --

U.S. PATENT DOCUMENTS

| Number | Date | Name | Class |
|---|---|---|---|
| 2,095,008 | 10/05/37 | Philipp | 62/115 |
| 2,342,299 | 02/22/44 | Peet | 225/40 |
| 2,512,545 | 06/20/50 | Hazard | 62/125 |
| 2,961,082 | 11/22/60 | Hanson et al. | 194/13 |
| 3,302,429 | 02/07/67 | Byrd | 62/514 |
| 4,843,826 | 07/04/89 | Malaker | 62/6 |
| 5,094,083 | 03/10/92 | Horn et al. | 62/6 |
| 5,735,131 | 04/07/98 | Lambright, Jr., et al. | 62/99 |
| 5,878,581 | 03/09/99 | DeFrances et al. | 62/50.2 |
| 6,112,526 | 09/05/00 | Chase | 62/6 |
| 1,815,170 | 07/21/31 | Summers | |
| 2,470,547 | 05/17/49 | Childers | 62/103 |
| 2,660,037 | 11/24/53 | Cooper | 62/116 |
| 2,672,029 | 03/16/54 | Saunders | 62/117.2 |
| 2,885,142 | 05/05/59 | Eberhart | 230/117 |
| 3,004,408 | 10/17/61 | Dros et al. | 62/419 |
| 3,206,943 | 09/21/65 | Rice et al. | |
| 3,230,733 | 01/25/66 | Rutishauser, et al. | 62/256 |
| 3,712,078 | 01/23/73 | Maynard et al. | 62/448 |
| 3,853,437 | 12/10/74 | Horn et al. | 418/61 |
| 3,997,028 | 12/14/76 | Lopez | 186/1 |
| 4,037,081 | 07/19/77 | Aldridge et al. | 219/387 |
| 4,037,650 | 07/26/77 | Randall | 165/29 |
| 4,138,855 | 02/13/79 | Jahan et al. | 62/112 |
| 4,176,526 | 12/04/79 | Missimer | 62/278 |
| 4,176,529 | 12/04/79 | Stierlin et al. | 62/490 |

U.S. PATENT DOCUMENTS

| Number | Date | Name | Class |
|---|---|---|---|
| 4,259,844 | 04/07/81 | Sarcia et al. | 62/6 |
| 4,275,705 | 06/30/81 | Schaus et al. | 126/110 R |
| 4,306,613 | 12/22/81 | Christopher | 65/32 |
| 4,377,074 | 03/22/83 | Jardine | 62/183 |
| 4,383,421 | 05/17/83 | Quesnoit | 62/333 |
| 4,416,122 | 11/22/83 | Johnson | 62/448 |
| 4,471,633 | 09/18/84 | Tinsler | 62/295 |
| 4,480,445 | 11/06/84 | Goldstein | 62/434 |
| 4,490,991 | 01/01/85 | Griffin | 62/279 |
| 4,539,737 | 09/10/85 | Kerpers et al. | 29/423 |
| 4,554,797 | 11/2/85 | Goldstein | 62/434 |
| 4,558,570 | 12/17/85 | Shtrikman et al. | 62/6 |
| 4,694,650 | 09/22/87 | Vincent | 60/520 |
| 4,726,193 | 02/23/88 | Burke et al. | 62/3 |
| 4,759,190 | 07/26/88 | Trachtenberg et al. | 62/3 |
| 4,783,968 | 11/15/88 | Higham et al. | 62/6 |
| 4,811,563 | 03/14/89 | Furuishi et al. | 60/517 |
| 4,823,555 | 04/25/89 | Trachtenberg et al. | 62/3 |
| 4,827,733 | 05/09/89 | Dinh | 62/305 |
| 4,827,735 | 05/09/89 | Foley | 62/430 |
| 4,831,831 | 05/23/89 | Carter et al. | 62/59 |
| 4,882,911 | 11/28/89 | Immel | 62/288 |
| 4,922,722 | 05/08/90 | Kazumoto et al. | 62/6 |
| 4,941,527 | 07/17/90 | Toth et al. | 165/47 |
| 4,949,554 | 08/21/90 | Branz et al. | 62/248 |

UNITED STATES PATENT AND TRADEMARK OFFICE
CERTIFICATE OF CORRECTION

PATENT NO. : 6,422,025 B1
DATED : July 23, 2002
INVENTOR(S) : Rudick et al.

It is certified that error appears in the above-identified patent and that said Letters Patent is hereby corrected as shown below:

Item [56] cont'd,

U.S. PATENT DOCUMENTS

| | | | |
|---|---|---|---|
| 4,964,279 | 10/23/90 | Osborne | 62/59 |
| 4,977,754 | 12/18/90 | Upton et al. | 62/248 |
| 4,996,841 | 03/05/91 | Meijer et al. | 60/525 |
| 5,069,273 | 12/03/91 | O'Hearne | 65/12 |
| 5,076,351 | 12/31/91 | Munekawa et al. | 165/104.21 |
| 5,142,872 | 09/01/92 | Tipton | 62/6 |
| 5,228,299 | 07/20/93 | Harrington et al. | 62/55.5 |
| 5,259,198 | 11/09/93 | Viegas et al. | 62/7 |
| 5,259,214 | 11/09/93 | Nagatomo et al. | 62/324.1 |
| 5,284,022 | 02/08/94 | Chung | 62/6 |
| 5,303,769 | 04/19/94 | Hoegberg | 165/108 |
| 5,305,825 | 04/26/94 | Roehrich et al. | 165/64 |
| 5,309,986 | 05/10/94 | Itoh | 165/104.26 |
| 5,311,927 | 05/17/94 | Taylor et al. | 165/64 |
| 5,333,460 | 08/02/94 | Lewis et al. | 62/6 |
| 5,341,653 | 08/30/94 | Tippmann et al. | 62/288 |
| 5,347,827 | 09/20/94 | Rudick et al. | 62/440 |
| 5,402,654 | 04/04/95 | Rudick et al. | 62/448 |
| 5,406,805 | 04/18/95 | Radermacher et al. | 62/81 |
| 5,417,079 | 05/23/95 | Rudick et al | 62/253 |
| 5,417,081 | 05/23/95 | Rudick et al. | 62/440 |
| 5,438,848 | 08/08/95 | Kim et al. | 62/342 |
| 5,440,894 | 08/15/95 | Schaeffer et al. | 62/203 |
| 5,493,874 | 02/27/96 | Landgrebe | 62/457.2 |

U.S. PATENT DOCUMENTS

| | | | |
|---|---|---|---|
| 5,496,153 | 03/05/96 | Redlich | 417/212 |
| 5,524,453 | 06/11/96 | James | 62/434 |
| 5,525,845 | 06/11/96 | Beale et al. | 310/30 |
| 5,537,820 | 07/23/96 | Beale et al. | 60/517 |
| 5,542,257 | 08/06/96 | Mattern-Klosson et al. | 62/55.5 |
| 5,551,250 | 09/03/96 | Yingst et al. | 62/234 |
| 5,596,875 | 01/28/97 | Berry et al. | 62/6 |
| 5,638,684 | 06/17/97 | Siegel et al. | 62/6 |
| 5,642,622 | 07/01/97 | Berchowitz et al. | 62/6 |
| 5,645,407 | 07/08/97 | Kralick et al. | 417/383 |
| 5,647,217 | 07/15/97 | Penswick et al. | 62/6 |
| 5,647,225 | 07/15/97 | Fischer et al. | 62/434 |
| 5,649,431 | 07/22/97 | Schroeder, Jr. | 62/434 |
| 5,655,376 | 08/12/97 | Price | 62/6 |
| 5,678,409 | 10/21/97 | Price | 62/6 |
| 5,678,421 | 10/21/97 | Maynard et al. | 62/407 |
| 5,724,833 | 03/10/98 | Devers | 62/625 |
| 5,782,106 | 07/21/98 | Park | 62/452 |
| 5,794,444 | 08/18/98 | Hofbauer et al. | 60/517 |
| 5,881,566 | 03/16/99 | Shacklock et al. | 62/277 |
| 5,895,033 | 04/20/99 | Ross et al. | 267/161 |
| 5,906,290 | 05/25/99 | Haberkorn | 220/505 |
| 5,920,133 | 07/06.99 | Penswick et al. | 310/17 |
| 5,927,079 | 07/27/99 | Sekiya et al. | 62/6 |
| 5,927,080 | 07/27/99 | Lee | 62/6 |

UNITED STATES PATENT AND TRADEMARK OFFICE
CERTIFICATE OF CORRECTION

PATENT NO. : 6,422,025 B1
DATED : July 23, 2002
INVENTOR(S) : Rudick et al.

It is certified that error appears in the above-identified patent and that said Letters Patent is hereby corrected as shown below:

Item [56] cont'd,

U.S. PATENT DOCUMENTS

| | | | |
|---|---|---|---|
| 6,003,319 | 12/21/99 | Gilley et al. | 6/23.7 |
| 6,023,937 | 02/15/00 | Rodrigues | 62/295 |
| 6,067,804 | 05/30/00 | Moeykens et al. | 62/84 |
| 6,073,547 | 06/13/00 | Westbrooks, Jr., et al. | 99/468 |
| 6,079,481 | 06/27/00 | Lowenstein et al. | 16/510 |
| 6,148,634 | 11/21/00 | Sherwood | 62/434 |
| 6,158,499 | 12/12/00 | Rhodes | 16/510 |
| 6,178,770 | 01/30/01 | Bradley, Jr., et al. | 62/434 |

FOREIGN PATENT DOCUMENTS

| | | |
|---|---|---|
| 2-217758 | 08/30/90 | Japan |
| 64-36468 | 02/07/89 | Japan |
| 7-180921 | 07/18/95 | Japan Toshiba Corp. |
| EP 0 935 063 A2 | 08/11/99 | Japan Sanyo Electric Co., Ltd. |
| JP 01 269874 | 27/10/89 | Japan Mitsubishi Electric Corp. - Abstract Only |
| EP 0 065 995 | 08/12/82 | Europe Fuji Electric Co., Ltd. |
| CH 233 266 | 15/07/44 | Germany Hermes Patentverwertungs |
| 233-266 | 07/15/44 | Patentverwertungs Ges Mit Besc |
| 2-609-789 | 07/22/88 | France Robert Cappa and Michel Vilais Gautrois |
| WO 98/34076 | 08/06/98 | Japan GAC Corporation |

OTHER PUBLICATIONS

Lyn Bowman, "A Technical Introduction to Free-Piston Stirling Cycle Machines: Engines, Coolers, and Heat Pumps," May, 1993, pp.1-7.
B.D. Mennink et al., "Development of an Improved Stirling Cooler for Vacuum Super Insulated Fridges WithThermal Store and Photovoltaic Power Source for Industrialized and Developing Countries," May 10-13, 1994, pp. 1-9.
D.M. Berchowitz et al., "Recent Advances in Stirling Cycle Refrigeration," August 20-25, 1995, 8 pages.
Kelly McDonald et al., "Stirling Refrigerator for Space Shuttle Experiments," August 7/11, 1994, 6 pages.
Sunpower, Inc., "Introduction to Sunpower, Stirling Machines and Free-Piston Technology," December, 1995.
D.M. Berchowitz et al., "Test Results for Stirling Cycle Cooled Domestic Refrigerators," September 3-6, 1996, 9 pages.
Royal Vendors, Inc., "G-III All Purpose Vendor Operation and Service Manual," September, 1996, pp. 1-67.
D.M. Berchowitz et al., "Stirling Coolers for Solar Refrigerators," 10 pages.
Michael K. Ewert et al., "Experimental Evaluation of a Solar PV Refrigerator with Thermoelectric, Stirling and Vapor Compression Heat Pumps," 7 pages.
D.M. Berchowitz, Ph.D., "Maximized Performance of Stirling Cycle Refrigerators," 8 pages.
David Bergeron, "Heat Pump Technology Recommendation for a Terrestrial Battery-Free Solar Refrigerator," September, 1998, pp. 1-25.
Seon-Young Kim, et al., "The Application of Stirling Cooler to Refrigeration," pp. 1023-1026.
R. H. Green, et al., "The Design and Testing of a Stirling Cycle Domestic Freezer," pp. 153-161.

UNITED STATES PATENT AND TRADEMARK OFFICE
CERTIFICATE OF CORRECTION

PATENT NO. : 6,422,025 B1
DATED : July 23, 2002
INVENTOR(S) : Rudick et al.

It is certified that error appears in the above-identified patent and that said Letters Patent is hereby corrected as shown below:

Item [56] cont'd,

OTHER PUBLICATIONS
Abstract of Japanese Publication No. 02302563 (Toshiba Corp.) 12/14/90.
Abstract of Japanese Publication No. 03036468 (Toshiba Corp.) 02/18/91.
Abstract of Japanese Publication No. 03294753 (Toshiba Corp.) 12/25/91.
Abstract of Japanese Publication No. 04217758 (Toshiba Corp.) 08/07/92.
Abstract of Japanese Publication No. 05203273 (Toshiba Corp.) 08/10/93.
Abstract of Japanese Publication No. 05306846 (Toshiba Corp.) 11/19/93.
Abstract of Japanese Publication No. 07180921 (Toshiba Corp.) 07/18/95.
Abstract of Japanese Publication No. 08005179 (Toshiba Corp.) 01/12/96.
Abstract of Japanese Publication No. 08100958 (Toshiba Corp.) 04/16/96.
Abstract of Japanese Publication No. 08247563 (Toshiba Corp.) 09/27/96.

--

Signed and Sealed this

Thirteenth Day of May, 2003

JAMES E. ROGAN
*Director of the United States Patent and Trademark Office*